(12) United States Patent  
Ellner et al.

(10) Patent No.: US 6,673,178 B2
(45) Date of Patent: Jan. 6, 2004

(54) METHOD FOR THE CONSTANT MAINTENANCE OF THE MEAN GAP WIDTH BETWEEN A SONOTRODE OF AN ULTRASONIC SYSTEM AND A TOOL OF AN ULTRASONIC CUTTING DEVICE DESIGNED AS A COUNTER SURFACE

(75) Inventors: Frank Ellner, Villingen-Schwenningen (DE); Harald Hielscher, Stahnsdorf (DE)

(73) Assignee: Dr. Hielscher GmbH, Teltow (DE)

( * ) Notice: Subject to any disclaimer, the term of this patent is extended or adjusted under 35 U.S.C. 154(b) by 56 days.

(21) Appl. No.: 10/024,608

(22) Filed: Nov. 8, 2001

(65) Prior Publication Data

US 2002/0074380 A1 Jun. 20, 2002

Related U.S. Application Data

(63) Continuation of application No. PCT/EP00/00262, filed on Jan. 15, 2000.

(30) Foreign Application Priority Data

Jan. 15, 1999 (DE) .......................................... 199 02 827

(51) Int. Cl.[7] .............................. B32B 31/18; B23K 1/06
(52) U.S. Cl. .................. 156/73.1; 156/73.3; 156/580.1; 156/580.2; 228/1.1; 228/8; 228/102; 228/110.1
(58) Field of Search ................................ 228/1.1, 110.1, 228/102, 103, 8, 9, 10; 606/169; 451/165; 156/73.1, 73.2, 73.3, 73.4, 580.1, 580.2

(56) References Cited

U.S. PATENT DOCUMENTS

| 4,161,420 | A | * | 7/1979 | Clarke et al. ............... 156/73.3 |
| 4,750,955 | A | * | 6/1988 | Haguenier |
| 4,759,170 | A | * | 7/1988 | Sawa et al. |
| 5,115,960 | A | * | 5/1992 | Shimizu |
| 5,355,755 | A | * | 10/1994 | Sakata et al. .................. 83/875 |
| 5,435,863 | A | * | 7/1995 | Frantz ......................... 156/64 |
| 5,711,847 | A | * | 1/1998 | Rajala et al. ............. 156/580.2 |
| 5,855,706 | A | * | 1/1999 | Grewell ....................... 156/64 |
| 6,190,296 | B1 | * | 2/2001 | Gnad et al. ..................... 493/8 |
| 6,308,881 | B1 | * | 10/2001 | Hesse et al. ................. 228/102 |
| 6,537,403 | B1 | * | 3/2003 | Blenke et al. ............. 156/73.1 |
| 6,547,903 | B1 | * | 4/2003 | McNichols et al. ........... 156/64 |
| 2002/0074380 | A1 | * | 6/2002 | Ellner et al. |
| 2003/0111157 | A1 | * | 6/2003 | Ehlert et al. |

FOREIGN PATENT DOCUMENTS

| DE | 19902827 C1 | * | 6/2000 |
| EP | WO 00/41873 | * | 7/2000 |

* cited by examiner

*Primary Examiner*—Kiley Stoner
(74) *Attorney, Agent, or Firm*—Brian L. Wamsley; Goodwin Procter LLP

(57) ABSTRACT

The invention concerns a method for the constant maintenance of the mean gap width between a sonotrode of an ultrasonic system and a tool of an ultrasonic cutting device, designed as a counter surface, for cutting and/or welding of various types of materials such as, for example, synthetic foils, textile fabrics containing synthetic substances, by means of a cutting tool, using an adjusting device.

15 Claims, 2 Drawing Sheets

Figure 1:
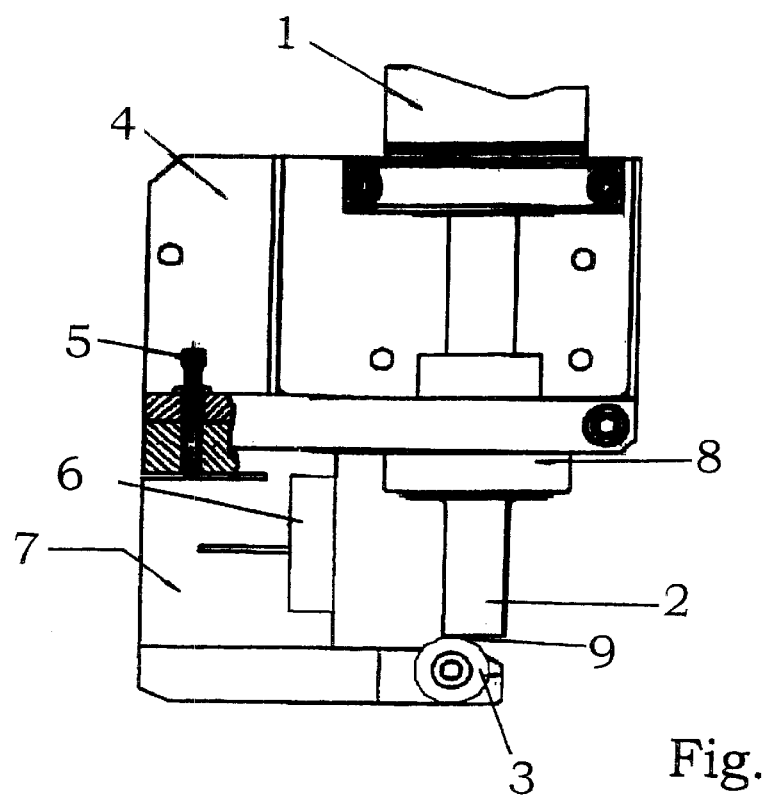

METHOD FOR THE CONSTANT MAINTENANCE OF THE MEAN GAP WIDTH BETWEEN A SONOTRODE OF AN ULTRASONIC SYSTEM AND A TOOL OF AN ULTRASONIC CUTTING DEVICE DESIGNED AS A COUNTER SURFACE

This application is a continuation of PCT/EP00/00262 filed Jan. 15, 2000.

DESCRIPTION

The invention concerns a method for the constant maintenance of the mean gap width between a sonotrode of an ultrasonic system and a tool of an ultrasonic cuffing device, designed as a counter surface, for cuffing and/or welding of various types of materials such as, for example, synthetic foils, textile fabrics containing synthetic substances, with the use of an adjusting device, wherein the contacting time between the sonotrode and a contacting surface for maintaining a constant clearance between the sontrode and at least one counter surface is kept constant by way of a control system.

In order to generate ultrasound and to apply it to a medium with a certain required performance rating, an ultrasonic transducer ($\lambda$/2-generator), which converts the applied electric energy into mechanical vibrations, a sonotrode and/or a horn are used in principle.

The sonotrode is to be regarded as a tool by way of which the ultrasonic power is conducted to the location of effect.

According to the general state of the art, the material course or the material courses placed over each other are conducted between a counter tool, for example a cutting tool, and the ultrasonic unit.

The longitudinal vibrations transmitted into the material cause a heating-up and/or a splitting of the material and, subsequently, the welding and/or cutting action.

In order to achieve a constant and optimal welding and cutting quality as well as achieving a minimisation of the cutting tool wear, the setting of an optimal and constant mean welding and/or cutting gap width between the sonotrode and the tool is of particular significance.

In the DE 44 39 284 A1 a device for the continuous ultrasonic processing of a material course is described where the gap between the sonotrode and the counter tool is adjustable. The ultrasonic transducer unit is rigidly connected with the machine column by way of a temperature-controlled adjusting device. By means of the temperature-controlled adjusting device, temperature-related length changes in the ultrasonic speed are to be compensated so that the weld and cutting gap indicates a constant size.

The disadvantage here is that only the temperature-related length changes are registered and compensated, but not the length changes of the associated components which result from material elasticity and tool wear and which can amount to some $\mu$m after, for example, the pass-through of a material course.

Therefore, the invention is based on the task assignment of developing a category-related method for the constant maintenance of the mean gap width of an ultrasonic cutting device, with which the drawbacks of the known methods and devices are avoided and with which it is ensured that different material types, particularly synthetic foils, can be welded and/or cut reliably and effectively at constant quality by means of the control of a constant and defined optimal gap width which is independent of external influential factors.

According to the invention, this task assignment is solved by the features of the independent claims. Correspondingly, the contacting time between the sonotrode and a contact surface for constant maintenance of the clearance between the sonotrode and at least one counter surface is kept constant by way of a control system. The control system consists, according to a most preferred embodiment follows, of two control circuits which are linked together. With a first and quick control circuit, using electronic means, the amplitude of the vibratory system (ultrasonic system) is continuously corrected and, subsequently, the contacting time is kept constant at quick cyclic load. With a second and slower control circuit, whose control time however is faster than the temperature change in the system, and with the assistance of at least one actuating element, thermally related and wear-related clearance changes which can no longer be compensated by the amplitude control because of their expected size, are compensated between the cutting tool and the sonotrode so that the pre-set contacting time is kept constant.

In this way, the real clearance and the real gap width, respectively, are covered. Deviations from the setpoint are automatically compensated independent of the influential factors. Constantly good and reproducible welding and cutting results as well as a minimum wear of the cutting tool and the sonotrode are ensured.

According to an embodiment of the invention, and by means of a suitable lever mechanism, two or several mean gap widths are kept constant, even then, when for example, re-regulation is necessary following wearing of a cutting point. The gap width of the following stage is individually smaller or equally as large as the gap width of the previous stage. In this way, for example, welding and cutting with a wear compensation during cutting is ensured. The welding and cutting geometries are independent of each other. For this reason, for example, it is possible to weld on a broad scale and to cut with an acute angle.

With separated and two-stage welding and cutting, respectively, the processing speeds increase considerably without reduction of the edge quality because, during the welding process, more energy can be applied to the material as the material has not yet been separated during the first treatment process.

The applied tools can be arranged and used in a variety of ways. For example, the non-contacting tool can be trunnion-mounted and can have a profiled surface.

Tool arrangement can also be such that one tool is vibratory and one tool is stationary in its position.

Advantageous embodiments of the invention according to independent claims result from the further Subclaims.

Figure 2:
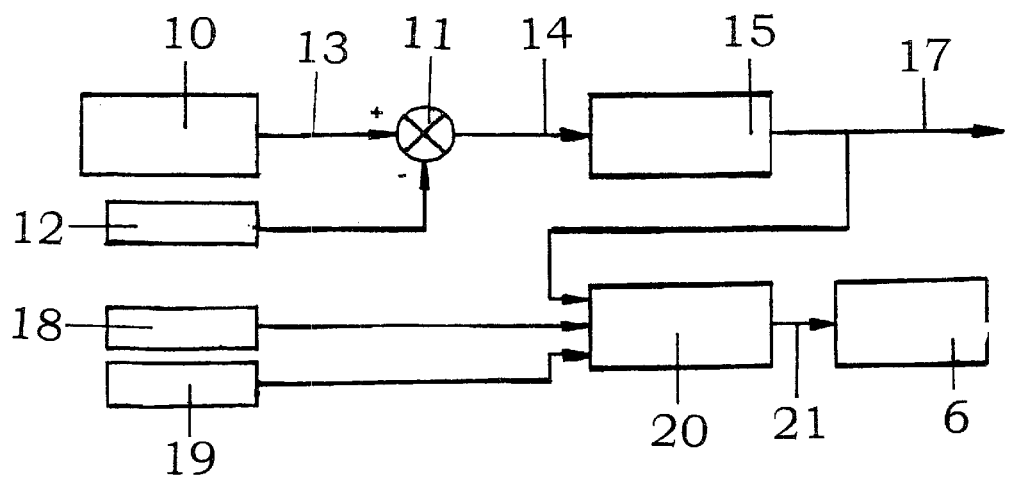

The invention will be better understood on the basis of a drawing of an embodiment of a cutting device. The following items are shown in the drawings:

FIG. 1: the schematic illustration of an ultrasonic cutting device,

FIG. 2: a schematic illustration of the control structure and

Figure 3:
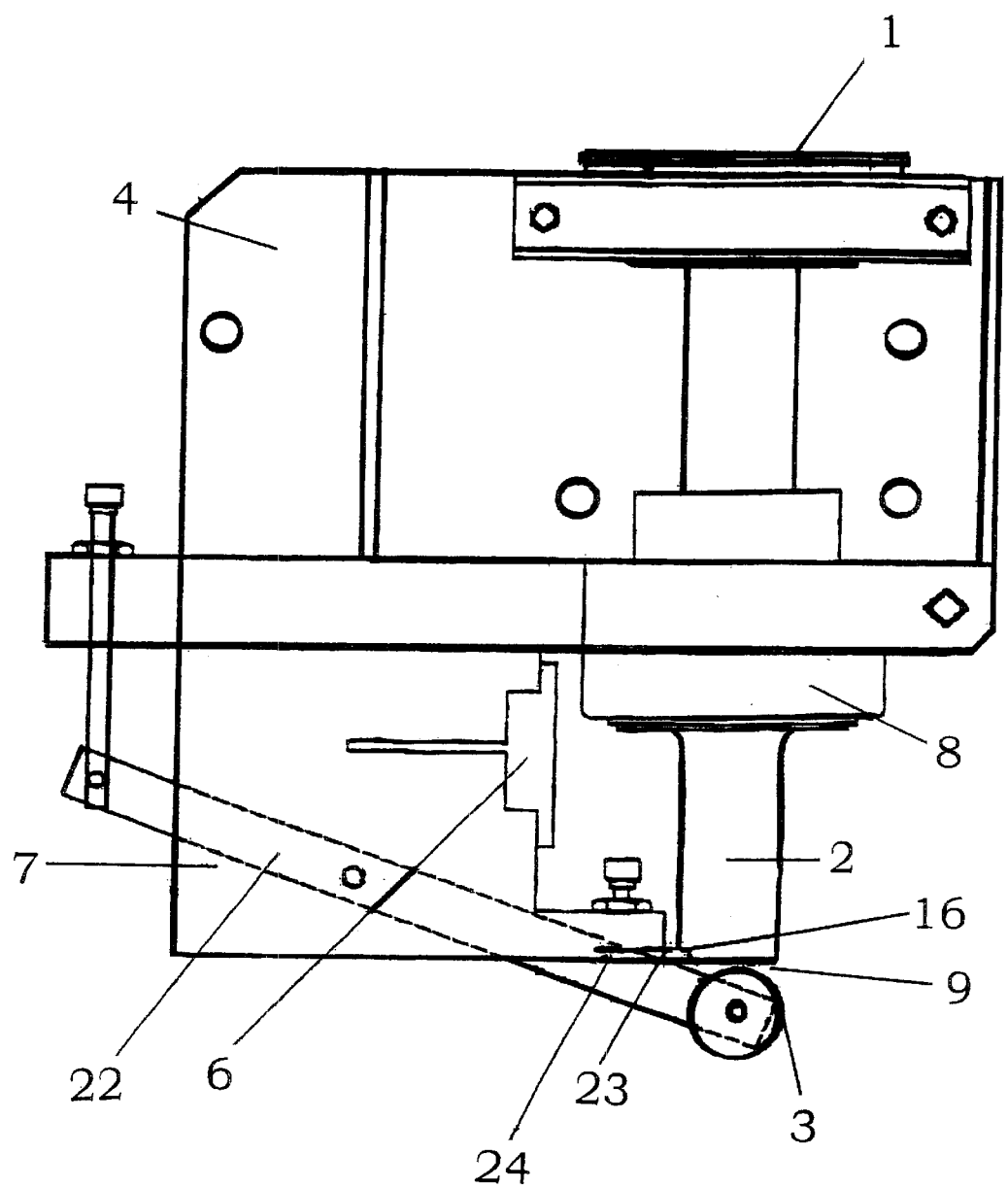

FIG. 3: the schematic illustration of a further embodiment.

According to the illustration shown in FIG. 1, the ultrasonic cutting device consists of an ultrasonic system 1, a sonotrode 2, which is connected by way of a vibration-free flange 8 with a securing plate 4, a coupling element 7, on which a cutting tool 3, here a welding and cutting plate, is secured, a setting screw 5, here a micrometer screw with which a gap 9 between the sonotrode 2 and the cutting tool 3 is mechanically adjustable, and of a thermal actuating element and lever system 6, here an actuator, for the compensation of thermally-related and wear-related clearance changes between the sonotrode 2 and the cutting tool 3 (gap 9).

The ultrasonic power is conducted to the cutting tool 3 by way of the sonotrode 2 of the ultrasonic system 1 which acts as an amplitude transformer. By way of the sonotrode 2, excited to ultrasonic vibrations in the longitudinal direction, a welding and/or cutting operation is effected in such a way that, during a brief fraction of the vibratory period, the material to be cut and the cutting tool 3 are in a positive locking engagement. If the material to be cut is also to be welded, then, by means of a corresponding form shaping of the sonotrode and the counter tool as well as by means of the material properties, the material is also pressed to such an extent that an adequately high temperature for welding the material is obtained. The control system according to FIG. 2 consists of two control circuits. The first control circuit is a quick control circuit with which, on the electronic path, the contacting time of sonotrode 2 and the cutting tool 3 is permanently measured and, by means of a change of the amplitude of the vibratory system 1, is corrected in such a way that the pre-set contacting time between the cutting tool 3 and the sonotrode 2 is kept constant.

The reference and/or the pre-set setpoint value 12 of the contacting time is derived from a pre-setting (basic setting) of the gap 9 by means of a micrometer screw 5. The mechanical setting of the gap 9 is effected here in such a way that the contacting time is very small, meaning, a value approaching zero (FIG. 1).

The setpoint value 12 of the contacting time can also be set with other adjusting devices, mechanically and/or electronically, also optical-electronically, manually or automatically, for example by means of piezo element. When constant maintenance has to be ensured over longer periods of time, then an automatic readjustment, possibly also with due consideration of the sonotrode wear, can be necessary.

The contacting time is electronically measured in a measuring circuit 10 (FIG. 2) and conducted to an evaluation circuit 11.

Where a quick cyclic load is concerned, for example when the material course runs into the gap 9, the minor elastic yielding of the rigid arrangement between the sonotrode 2 and the cutting tool 3 is subsequently fast, meaning, compensated in a few milliseconds, that the amplitude is increased immediately until the pre-set setpoint value 12 of the contacting time is obtained again. The opposite control is effected when the material course runs out of the gap 9, in which the amplitude of the vibration is reduced.

From the measurement of the contacting time, an impulse duration results as signal 13 proportional to the contacting time, which is compared with the solidly pre-set impulse duration (setpoint) 12 in the evaluation circuit 11, and processed to a correction signal 14 of the impulse duration, and conducted to an amplitude actuating element 15, which causes an increase or a reduction of the vibration amplitude by way of the amplitude correction signal 17.

With the first control circuit, a second and slower control circuit is connected with which, by way of a thermal actuating element 6 (actuator, FIG. 1) and a lever system, thermally-related and wear-related clearance changes between the cutting tool 3 and the sonotrode 2 are balanced. All thermally-related clearance changes (gap changes) are compensated.

The solidly pre-set reference values 18, 19 for the activation and deactivation of the thermal actuating element 6, together with the correction signal 17 for the amplitude adjustment, are led to an ON-/OFF temperature switch 20, whose output signal 21 is conducted to the thermal actuating element 6.

From the stipulation of an optimal working range for the contacting time, limit value signals are defined which are used for the mechanical basic setting of the mechanical comprehensive system.

The amplitude correction signal 17 acts in a defined signal range; the activation or deactivation of the thermal actuating element 6 is effected upon departure from this range.

An embodiment is shown in FIG. 3, two gap widths 9 can be kept constant with a lever mechanism 22 and an adjusting device 24.

Contrary to the embodiment as shown in FIG. 1, where the contacting surface is identical with the counter surface, the contacting surface 23, in this embodiment, is formed between a sonotrode recess 16 and an adjustable tongue 24. The counter surface here is the welding tool 3 which forms a constant gap 9 by way of the lever mechanism 22 with the sonotrode 2. Separation is not done in this case. The application of a cutting tool is also possible which partially cuts a material.

A material wear, as occurring with the direct contact between tool 3 and sonotrode 2, does not happen here and does not have to be re-adjusted. However, in this case two mean gap widths, meaning that of the contacting surface 23 and that of the counter surface 3, are kept constant. A non-illustrated variant indicates two counter surfaces, of which one is formed by a contacting surface where, for example, welding and subsequent separation is performed. In this case, the wear of the cutting tool is re-adjusted and the welding gap does not change as a result.

| List of Referenced Items | |
|---|---|
| 1 | Ultrasonic system |
| 2 | Sonotrode |
| 3 | Cutting tool |
| 4 | Securing plate |
| 5 | Setting screw |
| 6 | Actuating element (actuator) |
| 7 | Coupling element |
| 8 | Flange |
| 9 | Gap |
| 10 | Measuring circuit |
| 11 | Evaluation circuit |
| 12 | Setpoint impulse duration signal |
| 13 | Impulse duration signal |
| 14 | Correction signal |
| 15 | Amplitude actuating element |
| 16 | Sonotrode recess |
| 17 | Amplitude correction signal |
| 18 | Reference value |
| 19 | Reference value |
| 20 | ON/OFF temperature switch |
| 21 | Output switch |
| 22 | Lever mechanism |
| 23 | Contacting surface |
| 24 | Actuating element (adjustable tongue) |

What is claimed is:
1. A method for maintaining a mean gap between a sonotrode of an ultrasonic system and a tool of an ultrasonic cutting device, comprising
by way of a control system, maintaining a constant clearance between the sonotrode and at least one counter surface comprising maintaining a constant contact time between the sonotrode and the at least one contacting surface.

2. The method according to claim 1, wherein the ultrasonic cutting device is designed as a counter surface for cutting and welding materials.

3. The method according to claim 2, wherein the material comprises synthertic foils or textile fabrics containing synthetic substances.

4. The method according to claim 1 further comprising, wherein maintaining a constant contacting time comprises
providing a first control circuit;
continuously correcting an amplitude in the ultrasonic system by the first control circuit;
maintaining constant a contacting time at quick cyclic load by the first control circuit;
providing a second control circuit having a control time faster than temperature change in the ultrasonic system; and
the second control circuit for maintaining constant a pre-set contacting time by compensating thermally-related and wear-related clearance changes between the tool and the sonotrode by means of at least one actuating element.

5. The method according to claim 2 further comprising, wherein the at least one actuating element comprises a lever mechanism;
maintaining constant at least two pre-set mean gap widths,
the lever mechanism arranged wherein the gap width of a following stage is smaller or equal to a previous stage.

6. The method according to the claim 1 further comprising,
providing parallel counter surfaces, each having an adjusting device, and
periodically scanning in successive order the parallel contacting surfaces.

7. The method according to claim 2,
tuning the first and second control circuits to each other to increase effectiveness,
activating/deactivating the at least one actuating element if the amplitude is outside of a defined signal range of an amplitude correction signal.

8. The method according to the claim 1,
pre-setting a setpoint for the contacting time between the sonotrode and the contacting surface with an adjustment device so that the measured contacting time is very small and approaches zero.

9. The method according to the claim 8,
wherein the adjusting devices comprises a micrometer screw, piezo element, or an actuator.

10. The method according to the claim 2,
wherein the at least one actuating includes at least one probable aluminium part.

11. The method according to claim 1 further comprising,
cutting and welding with the tool; and
wherein the cutting and/or welding is performed in intermitting operation.

12. The method according to claim 1 further comprising,
applying the tool to the sonotrode; and
forming the mean gap width between the tool and a counter bearing acting with the tool.

13. A method of maintaining a constant mean gap between a sonotrode in an ultrasonic system and a counter surface in an ultrasonic cutting device, said method comprising:
providing a set-time;
measuring a contact time between the sonotrode and a contact surface; and
adjusting the contact time to the pre-set time when the contact time is different than the set-time.

14. The method according to claim 13 wherein measuring the contact time comprises
measuring a change in amplitude of a vibrating system.

15. The method according to claim 13 further comprising:
providing a defined amplitude range for operating the ultrasonic system;
providing preset activation/deactivation value of a thermal actuating element;
wherein the measuring step includes measuring a change in amplitude in a vibrating system; and activating or deactivating the thermal actuating element in response to an amplitude outside of the defined amplitude range.

* * * * *